United States Patent Office 3,414,386
Patented Dec. 3, 1968

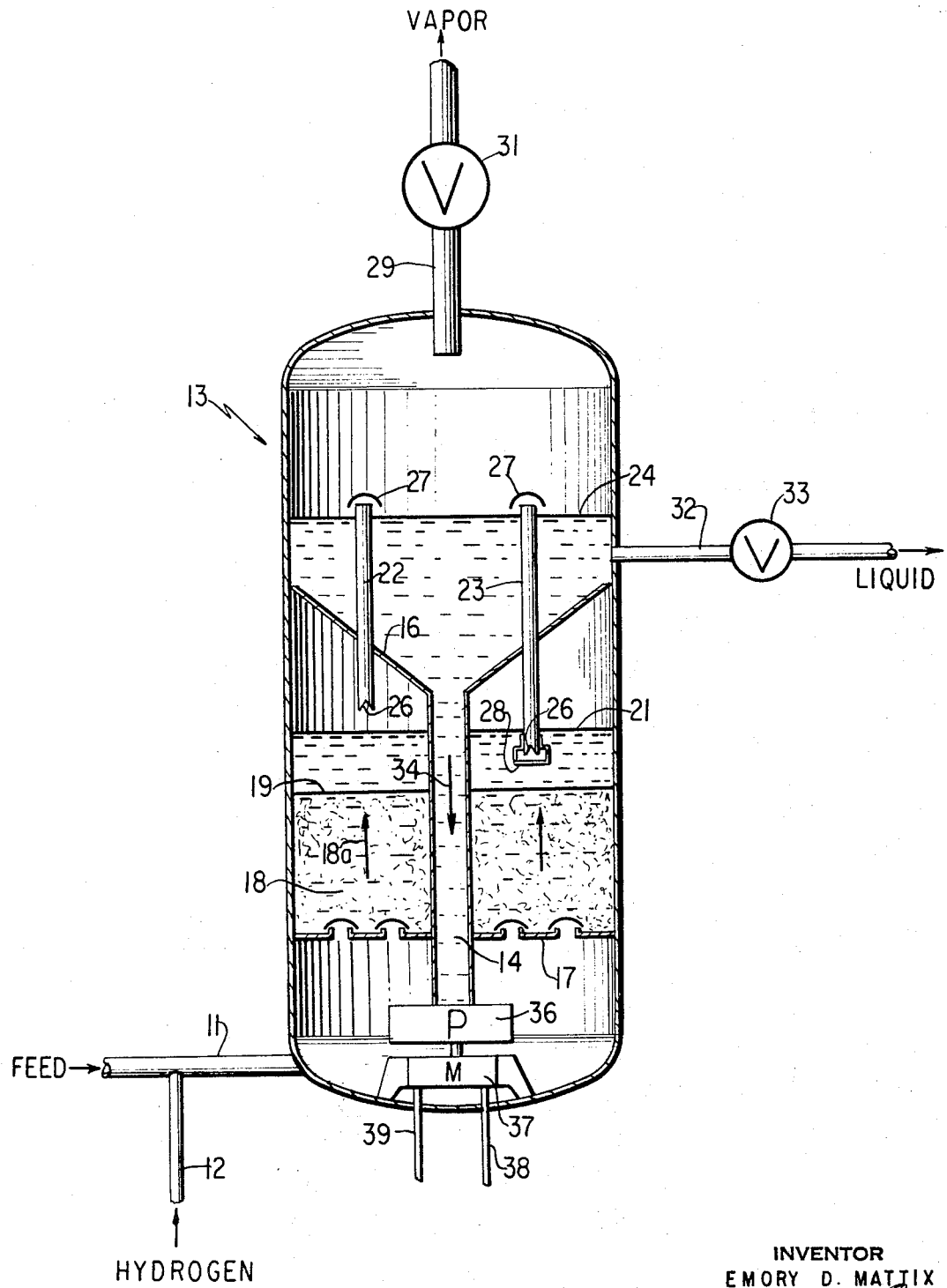

3,414,386
REACTION VESSEL FOR IMPROVED TEMPERATURE REGULATION IN EXOTHERMIC REACTIONS
Emory D. Mattix, Lake Charles, La., assignor to Cities Service Research and Development Company, New York, N.Y., a corporation of Delaware
Filed July 15, 1965, Ser. No. 472,142
3 Claims. (Cl. 23—288)

ABSTRACT OF THE DISCLOSURE

A generally vertical reaction vessel containing a recycle conduit having an enlarged upper end in peripheral contact with the wall of the reactor. Vertical conduits passing through the enlarged upper end of the recycle conduit provide means for gas and liquid to pass from the reactor space below the enlarged upper end of the recycle conduit to the reactor space above the enlarged upper end. In the space above the recycle conduit, liquid is allowed to separate from gas. Liquid substantially free of gas may then be recycled to control temperature differences within the reactor.

This invention relates to treatment of liquid with gas and more particularly to recycling of liquid in processes for the treatment of liquid hydrocarbon oil with gas. The invention has particular application to the treatment of liquid hydrocarbon oils with hydrogen.

In the treatment of liquid hydrocarbon oils with hydrogen, it is common practice to pass the liquid feed together with hydrogen upwardly through a reaction zone under appropriate operating conditions to obtain the desired hydrogenation reaction. Since hydrogenation reactions are exothermic, some provision must be made for cooling the material within the reaction zone in order to maintain temperature at the desired levels. One method of controlling temperature in the hydrogenation zone is to cool the contents of the reactor by the use of cooling coils within the reaction vessel or by withdrawing a stream from the reaction zone, cooling it and then returning it to the hydrogenation zone. Another method is to supply the feed to the hydrogenation zone at a temperature lower than the desired temperature in the hydrogenation zone. This method is generally preferable to direct cooling of the reactor contents. Unfortunately, since hydrogenation is an exothermic reaction, it is impossible to obtain the desired temperature throughout the entire hydrogenation zone merely by controlling the temperature of the feed and hydrogen entering the reaction zone. If the temperature of the feed and hydrogen is such as to produce the desired reaction temperature in the portion of the hydrogenation zone to which the feed and hydrogen is fed (the bottom of the reactor in a normal upflow reactor), then the exothermic hydrogenation reactions will result in the temperatures in the upper portion of the reactor being excessively high. Conversely, if the temperature of the feed or hydrogen entering the reactor is too low, the temperature in the lower part of the reactor will be insufficient to attain the desired hydrogenation reactions. In order to reduce this temperature difference within the reactor it has been found possible to recycle the contents of the reactor from top to bottom at a relatively high rate. In this manner the temperature spread within the reactor may be kept within reasonable limits.

The use of conventional recycle lines and pumps for recycling material within hydrogenation reactors at the high rates desired in order to maintain proper temperature control as described above has several marked disadvantages. These include not only the high cost of recycle pumps capable of handling the high volumes of recycle liquid required, but also attendant heat losses from the conventional external recycle lines and severe erosion of volves, pumps, etc., when solids are present in the system.

U.S. Patent 3,124,518 to Guzman et al. describes a method of recycling material within a reactor by making use of a difference in density between gas-free liquid flowing down through a recycle conduit and a mixture of liquid and gas flowing upwardly through the reactor surrounding the recycle conduit. The Guzman patent teaches that an enlarged upper end of the recycle conduit aids in separation of liquid from vapor and reduces entrainment of vapor within the recycle conduit. Experience has proven while apparatus as described in the Guzman et al. patent is successful in substantially reducing entrainment of gas in recycle liquid, there are at least some situations in which such entrainment is still a problem. The apparatus described and claimed herein is capable of performing an even more effective job of reducing entrainment of gas in recycle liquid than is the apparatus described in the Guzman et al. patent.

In a preferred embodiment the apparatus of the present invention comprises a generally vertical reaction vessel containing a recycle conduit having an enlarged upper end which is in peripheral contact with the wall of the reactor. Vertical conduits passing through the enlarged upper end of the recycle conduit provide a means for gas and liquid to pass from the reactor space below the enlarged upper end of the recycle conduit to the reactor space above the enlarged upper end. In the space above the recycle conduit, liquid is allowed to separate from gas and aid in the recycling as described below.

For a better understanding of the invention, reference should be had to the accompanying drawing, which is a somewhat diagrammatic illustration with equipment shown in elevation of apparatus suitable for carrying out a preferred embodiment of the invention as applied to the hydrogenation of liquid hydrocarbon oil.

In the drawing, feed oil entering through a conduit 11 and hydrogen entering through a conduit 12 pass through the conduit 11 into the lower portion of a reaction vessel 13. Hydrogen introduced through the conduit 12 may be pure hydrogen or may conveniently be hydrogen-containing gas such as recycle gas containing hydrogen as well as normally gaseuos hydrocarbons and possibly inert gases such as nitrogen. Hydrogen and feed, together with recycle liquid obtained from a recycle conduit 14 as described below, preferably pass through suitable distributing means, such as a bubble cap tray 17, for insuring even distribution of liquid and gas throughout the cross-sectional area of the reactor and pass upwardly through a hydrogenation zone 18 as indicated by arrows 18a. The reaction zone 18 may, as shown in the drawing, contain a bed of suitable hydrogenation catalyst. The catalyst may be in the form of a conventional fixed bed but is preferably in the form of an ebullated bed of catalyst, such as described in U.S. Patent 2,987,465 to Johanson. The upper level of ebullation of the catalyst may be maintained at 19 and an upper liquid level is preferably maintained as at 21. Liquid and gas which is passed upwardly through the hydrogenation zone 18 passes into an upper portion of the reactor through one or more conduits such as 22 and 23. These conduits pass through an enlarged upper end 16 of the recycle conduit 14 and allow liquid to separate from vapor in the upper portion of the reactor wherein an upper level of liquid 24 is maintained at a point below the upper ends of the conduits such as 22 and 23. The outer edge of the enlarged upper end 16 of the recycle conduit is in peripheral contact with the wall of the reactor so that gas and liquid flowing up through the reactor must pass through the conduits 22 and 23. The conduits 22 and 23 may if desired be provided at their lower ends with slots 26 and at their upper ends with caps or deflector plates 27.

While the invention in its broader aspects contemplates the use of one or more conduits such as 22 or 23 through which both gas and vapor might be withdrawn from the lower portion of the reactor and pass through the enlarged upper end 16 of the recycle conduit, it is preferred that separate conduits be used for passage of gas and liquid. Thus in the form shown, the conduit 23 extends downwardly below the lower end of the conduit 22 and is adapted for withdrawal of liquid. By proper sizing and spacing of such conduits, the liquid level 21 may be maintained above the lower ends of the conduits 23 but below the lower end of conduit 22. Conduit 22 is then used primarily for withdrawal of vapor from the space above the liquid level 21.

While it is possible to operate the apparatus described herein in hydrogenation processes employing finely divided catalyst which recycles with liquid or in processes in which catalyst is not used, it is preferred in the form shown that catalyst not be recycled with liquid. To reduce carryover of catalyst through the conduit 23 with liquid a deflector plate 28 may be provided. The deflector 28 is positioned a short distance below the open end of the conduit 23 to prevent direct upward flow of entrained catalyst particles into the conduit and may be constructed so as to form an integral part of the conduit 23.

From the upper portion of the reactor, vapor may be removed as through a conduit 29 and valve 31 while liquid may be removed through a conduit 32 and valve 33. Liquid separated from gas in the upper portion of the reactor above the enlarged upper end 16 of the recycle conduit passes downwardly through the recycle conduit 14 as indicated by arrow 34 for recycling through the hydrogenation zone 18 together with fresh feed and hydrogen introduced through the conduit 11. To aid in recycling liquid as described above, a recycle pump 36 may be provided within the lower portion of the reactor 13. The pump 36 may be a conventional centrifugal pump operated by a motor 37 which in turn may be operated by hydraulic fluid introduced under pressure through a conduit 38 and withdrawn through a conduit 39. The recycle pump is especially useful where a fixed or ebullated catalyst bed is maintained in the hydrogenation zone 18 since the effectiveness of induced recycle due to density difference is lessened by the presence of such relatively larger catalyst particles.

While the invention has been described above with respect to a preferred embodiment thereof, it will be understood by those skilled in the art that various changes and modifications may be made without departing from the spirit and scope of the invention and it is intended to cover all such changes and modifications in the appended claims.

I claim:

1. Apparatus comprising a generally vertical reaction vessel, means for introducing liquid and gaseous feed into the lower portion of said vessel, a generally vertical recycle conduit positioned within said vessel, said recycle conduit having an enlarged upper end in peripherical contact with the wall of the reactor and in fluid communication with an upper portion of the reaction vessel and a lower end in fluid communication with the lower portion of the reaction vessel, and at least one generally vertical conduit positioned within the reaction vessel and extending through the enlarged upper portion of the recycle conduit and having an open lower end in fluid communication with the interior of the reaction vessel outside of the recycle conduit and below the enlarged upper end of the recycle conduit and an open upper end in fluid communication with the interior of the reaction vessel above the enlarged upper end of the recycle conduit.

2. Apparatus according to claim 1 in which more than one generally vertically extending conduit is provided which passes through the enlarged upper end of the recycle conduit and in which the lower end of at least a first of such conduits terminates at an elevation above the lower ends of the other of such conduits whereby said first conduit is adapted to pass vapors upwardly through the enlarged upper end of the recycle conduit while other such conduits are adapted to pass liquid upwardly through the enlarged upper end of the recycle conduit and a liquid-vapor interface may be maintained at an elevation intermediate the lower end of said first conduit and the lower ends of such other conduits.

3. Apparatus according to claim 2 in which at least one of the conduits adapted for passage of liquid is provided with a deflector positioned below its lower end, said deflector being positioned so as to deflect upwardly moving particles away from the open end of said conduit.

No references cited.

JAMES H. TYMAN, JR., *Primary Examiner.*